(12) United States Patent
Jang

(10) Patent No.: US 8,723,462 B2
(45) Date of Patent: May 13, 2014

(54) METHODS, SYSTEMS AND APPARATUS FOR ESTIMATING ANGULAR POSITION AND/OR ANGULAR VELOCITY OF A ROTOR OF AN ELECTRIC MACHINE

(75) Inventor: Jihoon Jang, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 89 days.

(21) Appl. No.: 13/524,559

(22) Filed: Jun. 15, 2012

(65) Prior Publication Data

US 2013/0334993 A1 Dec. 19, 2013

(51) Int. Cl.
H02P 6/16 (2006.01)

(52) U.S. Cl.
USPC ............ 318/400.04; 318/280; 318/400.23; 318/650; 318/696

(58) Field of Classification Search
USPC ............ 318/400.04, 400.23, 280, 445, 466, 318/650, 696
See application file for complete search history.

(56) References Cited

U.S. PATENT DOCUMENTS

| | | | | |
|---|---|---|---|---|
| 3,997,828 A * | 12/1976 | Bottcher et al. | | 318/603 |
| 4,000,368 A * | 12/1976 | Tisue | | 358/410 |
| 4,316,390 A * | 2/1982 | Kretz | | 73/620 |
| 4,494,509 A * | 1/1985 | Long | | 123/406.19 |
| 4,710,770 A * | 12/1987 | Hakata et al. | | 340/870.18 |
| 4,787,354 A * | 11/1988 | Wilens et al. | | 123/406.19 |
| RE34,183 E * | 2/1993 | Wilens et al. | | 123/406.19 |
| 5,283,702 A * | 2/1994 | Tsuyuguchi et al. | | 360/75 |
| 5,315,226 A * | 5/1994 | Fehlauer et al. | | 318/715 |
| 5,408,751 A * | 4/1995 | Rodloff et al. | | 33/318 |
| 5,594,307 A * | 1/1997 | Adachi et al. | | 318/280 |
| 5,980,211 A * | 11/1999 | Tojo et al. | | 417/45 |
| 6,011,369 A * | 1/2000 | Grass | | 318/445 |
| 6,014,000 A * | 1/2000 | Gutierrez | | 318/696 |
| 6,984,955 B2 * | 1/2006 | Akiyama | | 318/650 |
| 7,230,401 B2 * | 6/2007 | Muroi et al. | | 318/466 |
| 2003/0184248 A1* | 10/2003 | Muroi et al. | | 318/466 |
| 2013/0249457 A1* | 9/2013 | Gallegos-Lopez et al. | | 318/400.23 |

OTHER PUBLICATIONS

Lorenz, R. and Van Patten, K., "High-Resolution Velocity Estimation for All-Digital, ac Servo Drives", IEEE Transaction on Industry Applications, Jul./Aug. 1991, pp. 701-705, vol. 27, No. 4.

* cited by examiner

Primary Examiner — Paul Ip

(74) Attorney, Agent, or Firm — Ingrassia Fisher & Lorenc, P.C.

(57) ABSTRACT

Embodiments of the present disclosure relate to methods, systems and apparatus for estimating angular position and/or angular velocity of a rotor of an electric machine.

20 Claims, 8 Drawing Sheets

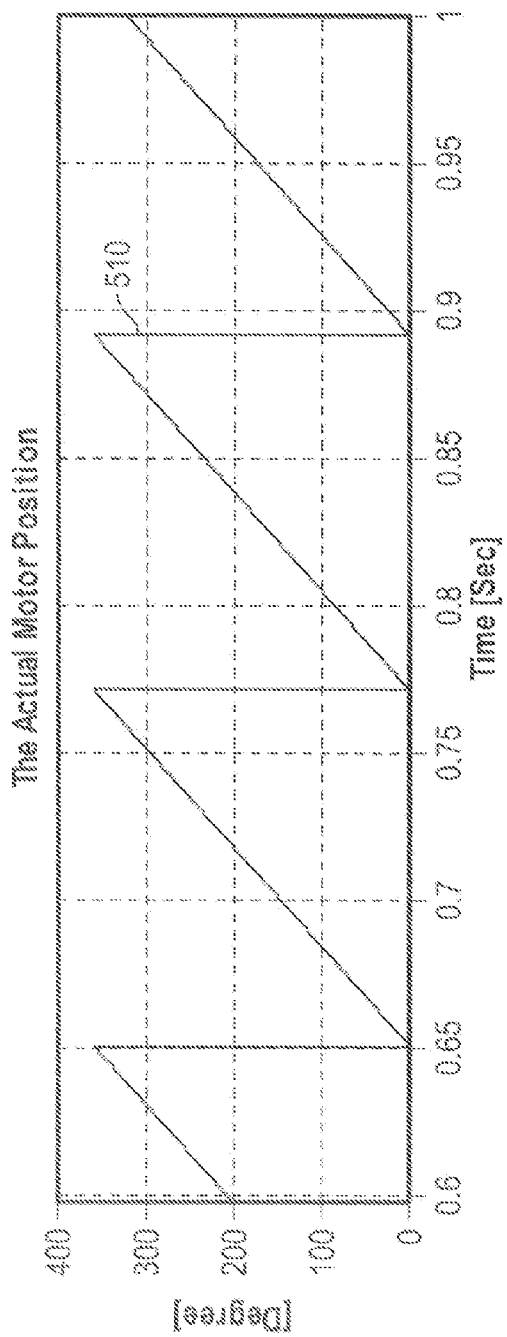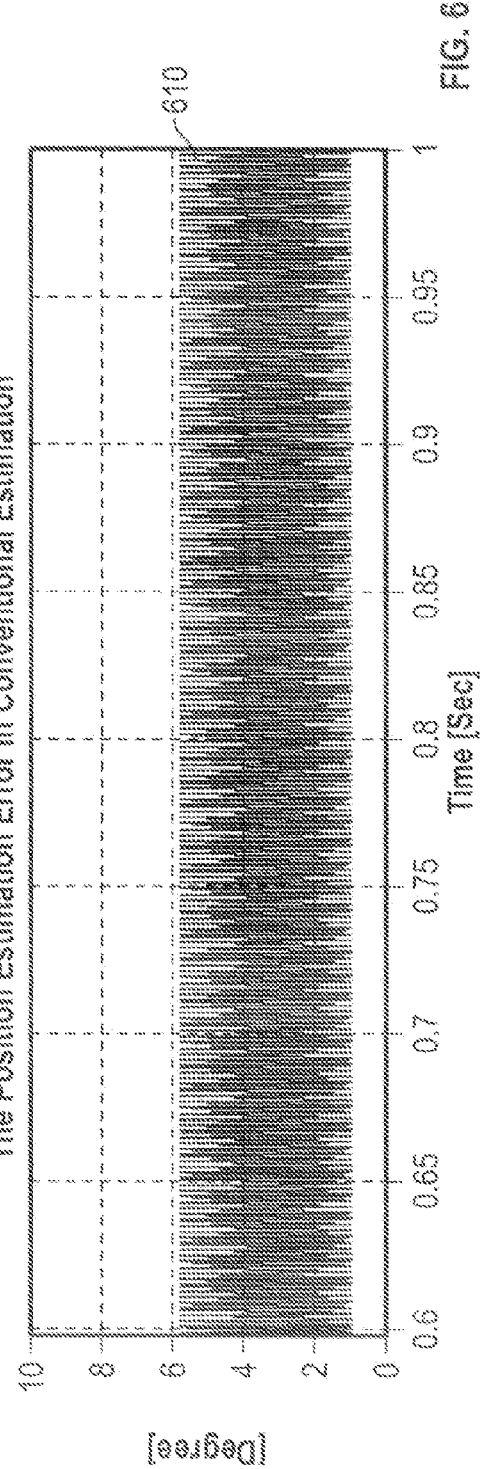

METHODS, SYSTEMS AND APPARATUS FOR ESTIMATING ANGULAR POSITION AND/OR ANGULAR VELOCITY OF A ROTOR OF AN ELECTRIC MACHINE

TECHNICAL FIELD

The technical field generally relates to techniques for controlling operation of multi-phase electric machines, and more particularly relates to methods, systems and apparatus for estimating angular position and/or angular velocity of a rotor of an electric machine.

BACKGROUND

Hybrid and electric vehicles (HEVs) typically include an electric traction drive system that includes at least one alternating current (AC) electric motor which is driven by a power inverter module (PIM) with power from a direct current (DC) power source, such as a storage battery. Motor windings of the AC electric motor can be coupled to inverter sub-modules of the PIM. Each inverter sub-module includes a pair of switches that switch in a complementary manner to perform a rapid switching function to convert the DC power to AC power. A pulse width modulation (PWM) module receives voltage command signals and applies PWM waveforms to the voltage command signals to control pulse width modulation of the voltage command signals and generate switching vector signals that are provided to the inverter sub-modules of the inverter module. When the switching vector signals are applied, each pair of switches in each of the inverter sub-module switch in a complementary manner to perform a rapid switching function to convert the DC power to AC power. This AC power drives the AC electric motor, which in turn drives a shaft of HEV's drivetrain.

Vector Control

Many modern high performance AC motor drives use the principle of field oriented control (FOC) or "vector" control to control operation of the AC electric motor. In particular, vector control is often used in variable speed drives to control currents fed to an AC electric motor so that the torque applied to a shaft by the AC electric motor can be controlled and hence the mechanical angular velocity of motor's rotor can be controlled. In short, stator phase currents are measured and converted into a corresponding complex space vector. This current vector is then transformed to a coordinate system rotating with the rotor of the AC electric motor.

To ensure proper control of the electric machine, vector control requires angular position information of the rotor (i.e., the mechanical rotational angular position of rotor relative to the "stator" or motor windings).

Traditional motor control systems normally include a feedback device (e.g., angular position or speed sensor) to provide angular position or frequency information about the motor. For example, many vector controlled motor drive systems employ a rotor speed or position sensor to provide information regarding the rotor's angular position that is needed to control the motor. For instance, the rotor's angular position can be computed based on actual measured quantities using some type of speed or position sensor for control feedback measurement. As one example, to determine the angular position of the rotor, its angular speed can be measured with a speed sensor, and the angular position can then be obtained by integrating the speed measurements. Other field-oriented or vector controlled systems may use a rotor angular position sensor or rotational transducer that provides absolute position information directly to implement motor control techniques. One such example would be a resolver and resolver-to-digital converter circuit, which directly provides position information that corresponds to the rotor's angular position.

It is important that the sensors have sufficient accuracy and resolution, and therefore, many systems employ high resolution sensors to help improve system performance. At the same time, the cost of feedback devices and associated interface circuits is significant, and therefore it is desirable to reduce cost of these devices. As such, in some cases, it may be desirable to employ low resolution sensors since they are less expensive.

However, when the resolution of the sensor is low, the computed and/or the estimated angular position can have substantial ripples and errors. This can degrade control performance (e.g., in terms of torque accuracy/linearity that can be achieved).

It would be desirable to provide improved methods, systems and apparatus for estimating angular position and angular velocity of an electric machine's rotor that can allow for the quality of the estimated angular position and angular velocity to be improved. It would also be desirable if such improved methods and systems for estimating angular position and angular velocity can improve torque accuracy such that the actual output torque generated closely tracks commanded torque. It would also be desirable if such methods, systems and apparatus can allow for use of low resolution sensors and thus decrease cost of systems that rely on sensors to estimate angular velocity and/or angular position. Other desirable features and characteristics of the present invention will become apparent from the subsequent detailed description and the appended claims, taken in conjunction with the accompanying drawings and the foregoing technical field and background.

SUMMARY

Embodiments of the present disclosure relate to methods, systems and apparatus for estimating angular position and/or angular velocity of a rotor of an electric machine.

In accordance with one of the disclosed embodiments, a method is provided for estimating an angular position and angular velocity of a rotor of an electric machine.

Based on a second counter output signal and a first counter output signal, a first angular position signal and a first angular velocity signal are computed. The first angular position signal represents a computed rotor angular position ($\theta_{MT}[n]$) during a present control period, and the first angular velocity signal represents a computed rotor angular velocity ($\omega_{MT}[n]$) during the present control period. Based on the second counter output signal, it is determined whether a difference ($\Delta N_p[n]$) between a number of pulses detected during two consecutive control periods is equal to zero. The two consecutive control periods are referred to below as a present control period and a previous control period.

When the difference ($\Delta N_p[n]$) determined from the second counter output signal is determined to be equal to zero, a number of times no pulse was received ($N_{np}[n]$) during the present control period is set equal to a sum of one and a number of times no pulse was received during the previous control period ($N_{np}[n-1]$). A second angular velocity signal can then be generated that represents an adjusted version of the computed rotor angular velocity ($\omega_{MTa}[n]$) during the present control period by setting the second angular velocity signal equal to a value ($\omega_{MTa}[n-1]$) of the second angular velocity signal that was computed during the previous control period.

In some embodiments, a second angular position signal can also be generated that represents an adjusted version of the computed rotor angular position ($\theta_{MTa}[n]$) during the present control period.

For example, in some implementations, it can also be determined whether the number of times no pulse was received ($N_{np}[n]$) during the present control period is equal to one (1).

When the number of times no pulse was received ($N_{np}[n]$) during the present control period is equal to one, the second angular position signal can be generated by setting the second angular position signal ($\theta_{MTa}[n]$) equal to a first sum. The first sum that comprises the sum: (1) a first product, and (2) a value ($\theta_{MT}[n-1]$) of a first angular position signal that was computed during the previous control period.

By contrast, when the number of times no pulse was received ($N_{np}[n]$) during the present control period is not equal to one, the second angular position signal can be generated by setting the second angular position signal ($\theta_{MTa}[n]$) equal to a second sum. The second sum that comprises the sum of (1) the first product, and (2) a value ($\theta_{MTa}[n-1]$) of the second angular position signal that was computed during the previous control period. The first product can be computed based on the present control period ($T_s[n]$) and a value of a first variable ($\omega_{MT1}[n]$) that is equal to a value ($\omega_{MTa}[n-1]$) of the second angular velocity signal that was computed during the previous control period.

DESCRIPTION OF THE DRAWINGS

Embodiments of the present disclosure will hereinafter be described in conjunction with the following drawing figures, wherein like numerals denote like elements.

FIG. 5 is a graph that illustrates actual rotor angular position in degrees as a function of time in seconds.

FIG. 6 is a graph that illustrates rotor angular position estimation error in degrees as a function of time in seconds when a conventional angular velocity observer is used to estimate rotor angular position as the actual rotor angular position varies as shown in FIG. 5.

DESCRIPTION OF EXEMPLARY EMBODIMENTS

Figure 1:
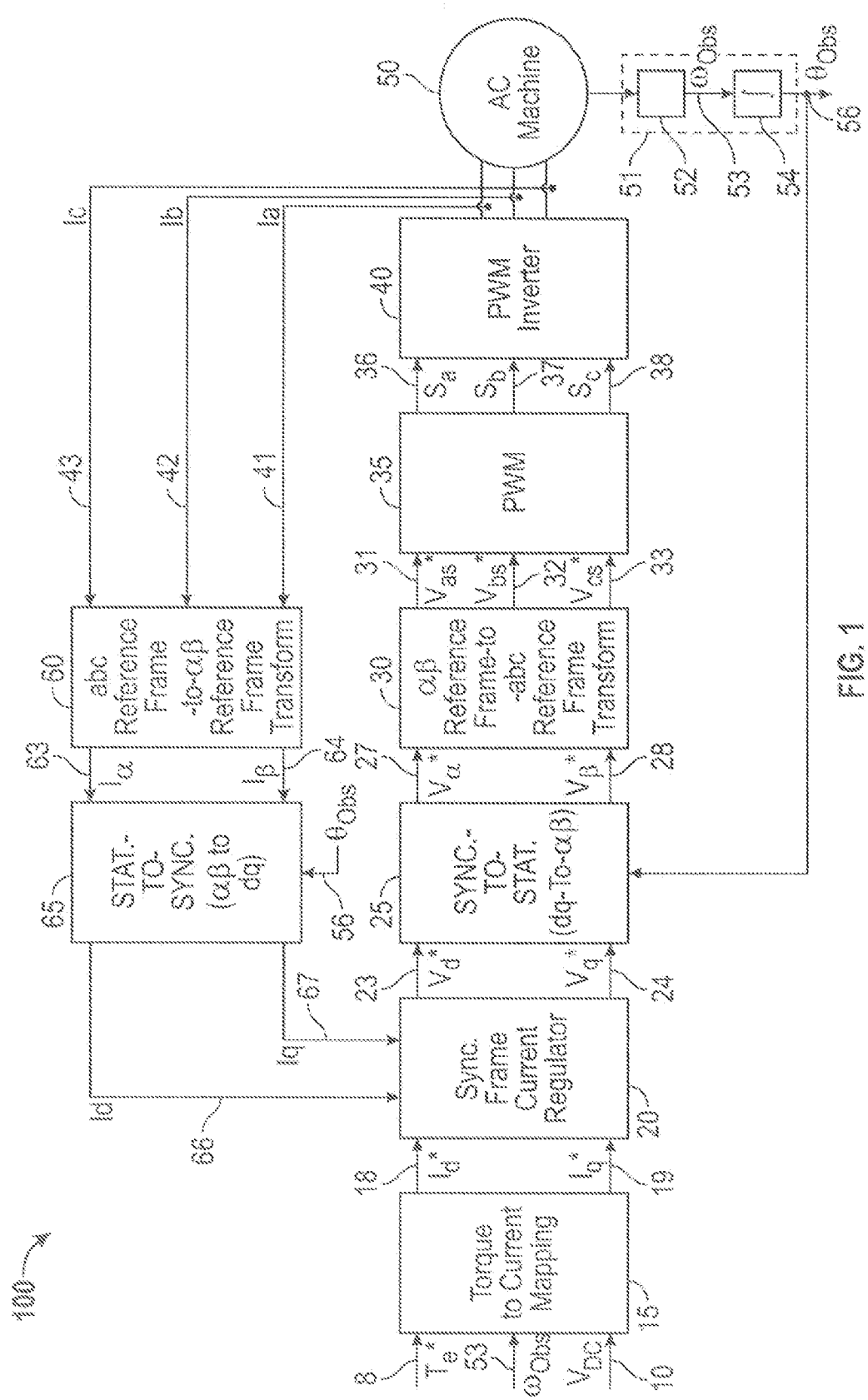
FIG. 1 is a block diagram of one example of a motor drive system in accordance with some of the disclosed embodiments.

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following detailed description.

Before describing in detail embodiments that are in accordance with the present invention, it should be observed that the embodiments reside primarily in combinations of method steps and apparatus components related to estimating angular position and angular velocity of a rotor of an electric machine. It will be appreciated that embodiments of the invention described herein can be implemented using hardware, software or a combination thereof. The control circuits described herein may comprise various components, modules, circuits and other logic which can be implemented using a combination of analog and/or digital circuits, discrete or integrated analog or digital electronic circuits or combinations thereof. As used herein the term "module" refers to a device, a circuit, an electrical component, and/or a software based component for performing a task. In some implementations, the control circuits described herein can be implemented using one or more application specific integrated circuits (ASICs), one or more microprocessors, and/or one or more digital signal processor (DSP) based circuits when implementing part or all of the control logic in such circuits. It will be appreciated that embodiments of the invention described herein may be comprised of one or more conventional processors and unique stored program instructions that control the one or more processors to implement, in conjunction with certain non-processor circuits, some, most, or all of the functions for estimating angular position and angular velocity of a rotor of an electric machine, as described herein. As such, these functions may be interpreted as steps of a method for estimating angular position and angular velocity of a rotor of an electric machine. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions will be described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Overview

Embodiments of the present invention relate to methods, systems and apparatus for estimating angular position and angular velocity of a rotor of an electric machine used in a multi-phase system. In one exemplary implementation, the multi-phase machine can be implemented in operating environments such as a hybrid/electric vehicle (HEV). In the exemplary implementations which will now be described, the control techniques and technologies will be described as applied to a hybrid/electric vehicle. However, it will be appreciated by those skilled in the art that the same or similar techniques and technologies can be applied in the context of other systems in which it is desirable to estimate angular position and angular velocity of a rotor of an electric machine used in a multi-phase system. In this regard, any of the concepts disclosed here can be applied generally to "vehicles," and as used herein, the term "vehicle" broadly refers to a non-living transport mechanism having an AC machine. In addition, the term "vehicle" is not limited by any specific propulsion technology such as gasoline or diesel fuel. Rather, vehicles also include hybrid vehicles, battery electric vehicles, hydrogen vehicles, and vehicles which operate using various other alternative fuels.

As used herein, the term "alternating current (AC) machine" generally refers to a device or apparatus that converts electrical energy to mechanical energy or vice versa. AC machines can generally be classified into synchronous AC machines and asynchronous AC machines. Synchronous AC machines can include permanent magnet machines (e.g., surface mount permanent magnet machines (SMPMMs) and interior permanent magnet machines (IPMMs)) and reluctance machines. By contrast, asynchronous AC machines include induction machines.

Although an AC machine can be an AC motor (e.g., apparatus used to convert AC electrical energy power at its input to produce to mechanical energy or power), an AC machine is not limited to being an AC motor, but can also encompass generators that are used to convert mechanical energy or power at its prime mover into electrical AC energy or power at its output. Any of the machines can be an AC motor or an AC generator. An AC motor is an electric motor that is driven by an alternating current. In some implementations, an AC motor includes an outside stationary stator having coils supplied with alternating current to produce a rotating magnetic field, and an inside rotor attached to the output shaft that is given a torque by the rotating field. Depending on the type of rotor used, AC motors can be classified as synchronous or asynchronous.

FIG. 1 is a block diagram of one example of a vector controlled motor drive system 100 in accordance with the disclosed embodiments. The system 100 controls a three-phase AC machine 50 via a three-phase pulse width modulated (PWM) inverter module 40 coupled to the three-phase AC machine 50 so that the three-phase AC machine 50 can efficiently use a DC input voltage (Vdc) 10 provided to the three-phase PWM inverter module 40 by adjusting current commands that control the three-phase AC machine 50. In one particular implementation, the vector controlled motor drive system 100 can be used to control torque in an HEV.

In the following description of one particular non-limiting implementation, the three-phase AC machine 50 is embodied as an AC powered machine 50, and in particular a three-phase AC powered machine; however, it should be appreciated that the illustrated embodiment is only one non-limiting example of the types of AC machines that the disclosed embodiments can be applied to, and further that the disclosed embodiments can be applied to any type of multi-phase AC powered machine that includes fewer or more phases.

The three-phase AC motor 50 is coupled to the three-phase PWM inverter module 40 via three inverter poles and generates mechanical power (Torque×Speed) based on three-phase sinusoidal current signals 41 . . . 43 received from the PWM inverter module 40.

An angular position and velocity estimator 51 is provided that includes an angular velocity observer module 52 and an angular position observer module 54. The angular velocity observer module 52 generates a signal 53 that represents an observed rotor angular velocity ($\omega_{Obs}$), and the angular position observer module 54 integrates signal 53 to generate a signal 56 that represents an observed rotor angular position ($\theta_{Obs}$).

The vector control motor drive system 100 includes a torque-to-current mapping module 15, a synchronous (SYNC.) frame current regulator module 20, a synchronous-to-stationary (SYNC.-TO-STAT.) transformation module 25, an αβ reference frame-to-abc reference frame (αβ-to-abc) transformation module 30, a pulse width modulation (PWM) module 35, a three-phase PWM inverter 40, an abc reference frame-to-αβ reference frame (abc-to-αβ) transformation module 60, and a stationary-to-synchronous (STAT.-TO-SYNC.) transformation module 65.

The torque-to-current mapping module 15 receives a torque command input signal (Te*) 8, the observed rotor angular velocity ($\omega_{Obs}$) 53, and a DC input voltage ($V_{DC}$) 10 as inputs, along with possibly a variety of other system parameters depending upon implementation. The torque-to-current mapping module 15 uses these inputs to generate a d-axis current command (Id*) 18 and a q-axis current command (Iq*) 19 that will cause the machine 50 to generate the commanded torque (Te*) at the observed rotor angular velocity ($\omega_{Obs}$) 53. In particular, the torque-to-current mapping module 15 uses the inputs to map the torque command input signal (Te*) 8 to a d-axis current command signal (Id*) 18 and a q-axis current command signal (Iq*) 19. The synchronous reference frame d-axis and q-axis current command signals (Id*, Iq*) 18, 19 are DC commands that have a constant value as a function of time at steady state when the commanded torque (Te*), the observed rotor angular velocity ($\omega_{Obs}$) 53, and the DC input voltage ($V_{DC}$) 10 are constant.

The abc-to-αβ transformation module 60 receives the measured three-phase stationary reference frame feedback stator currents (Ia . . . Ic) 41-43 that are feedback from the machine 50. The abc-to-αβ transformation module 60 uses these three-phase stationary reference frame feedback stator currents 41-43 to perform an abc reference frame-to-αβ reference frame transformation to transform the three-phase stationary reference frame feedback stator currents 41-43 into stationary reference frame feedback stator currents (Iα, Iβ) 63, 64. The abc-to-αβ transformation is well-known in the art and for sake of brevity will not be described in detail.

The stationary-to-synchronous transformation module 65 receives the stationary reference frame feedback stator currents (Iα, Iβ) 63, 64 and the observed rotor angular position ($\theta_{Obs}$) 56 and generates (e.g., processes or converts) these stationary reference frame feedback stator currents (Iα, Iβ) 63, 64 to generate a synchronous reference frame d-axis current signal (Id) 66 and a synchronous reference frame q-axis current signal (Iq) 67. The process of stationary-to-synchronous conversion is well-known in the art and for sake of brevity will not be described in detail.

The synchronous frame current regulator module 20 receives the synchronous reference frame d-axis current signal (Id) 66, the synchronous reference frame q-axis current signal (Iq) 67, the d-axis current command (Id*) 18 and the q-axis current command (Iq*) 19, and uses these signals to generate a synchronous reference frame d-axis voltage command signal (Vd*) 23 and a synchronous reference frame q-axis voltage command signal (Vq*) 24. The synchronous reference frame voltage command signals (Vd*, Vq*) 23, 24 are DC commands that have a constant value as a function of time for steady state operation when the commanded torque (Te*), the observed rotor angular velocity ($\omega_{Obs}$) 53, and the DC input voltage ($V_{DC}$) 10 are constant. The process of current to voltage conversion can be implemented as a Proportional-Integral (PI) controller, which is known in the art and for sake of brevity will not be described in detail. Because the current commands are DC signals (at steady state) in the synchronous reference frame they are easier to regulate in comparison to AC stationary reference frame current commands.

The synchronous-to-stationary transformation module 25 receives the synchronous reference frame d-axis voltage command signal (Vd*) 23 and the synchronous reference frame q-axis voltage command signal (Vq*) 24 as inputs along with the observed rotor angular position ($\theta_{Obs}$) 56, and performs a dq-to-αβ transformation to generate an α-axis stationary reference frame voltage command signal (Vα*) 27 and a β-axis stationary reference frame voltage command signal (Vβ*) 28. The stationary reference frame α-axis and β-axis voltage command signals (Vα*, Vβ*) 27, 28 are in the stationary reference frame and therefore have values that vary as a sine wave as a function of time. The process of synchronous-to-stationary conversion is well-known in the art and for sake of brevity will not be described in detail.

The αβ-to-abc transformation module 30 receives the stationary reference frame voltage command signals (Vα*, Vβ*) 27, 28, and based on these signals, generates stationary reference frame voltage command signals (Vas* . . . Vcs*) 31, 32, 33 (also referred to as "phase voltage command signals") that are sent to the PWM module 35. The αβ-to-abc transformation is well-known in the art and for sake of brevity will not be described in detail.

The three-phase PWM inverter module 40 is coupled to the PWM module 35. The PWM module 35 is used for the control of PWM of the phase voltage command signals (Vas* . . . Vcs*) 31, 32, 33. The switching vector signals (Sa . . . Sc) 36, 37, 38 are generated based on duty cycle waveforms that are not illustrated in FIG. 1, but are instead internally generated at the PWM module 35 to have a particular duty cycle during each PWM period. The PWM module 35 modifies the phase voltage command signals (Vas* . . . Vcs*) 31, 32, 33 based on the duty cycle waveforms (not illustrated in FIG. 1) to generate switching vector signals (Sa . . . Sc) 36, 37, 38, which it provides to the three-phase PWM inverter module 40. The particular modulation algorithm implemented in the PWM module 35 can be any known modulation algorithm including Space Vector Pulse Width Modulation (SVPWM) techniques to control of pulse width modulation (PWM) to create alternating current (AC) waveforms that drive the three-phase AC powered machine 50 at varying speeds based on the DC input 10.

The switching vector signals (Sa . . . Sc) 36, 37, 38 control the switching states of switches in PWM inverter 40 to generate three-phase voltage commands at each phase A, B, C. The switching vector signals (Sa . . . Sc) 36, 37, 38 are PWM waveforms that have a particular duty cycle during each PWM period that is determined by the duty cycle waveforms that are internally generated at the PWM module 35.

The three-phase PWM inverter module 40 receives the DC input voltage (Vdc) and switching vector signals (Sa . . . Sc) 36, 37, 38, and uses them to generate three-phase alternating current (AC) voltage signal waveforms at inverter poles that drive the three-phase AC machine 50 at varying rotor speeds ($\omega r$).

The three-phase machine 50 receives the three-phase voltage signals generated by the PWM inverter 40 and generates a motor output at the commanded torque Te*8.

Although not illustrated in FIG. 1, the system 100 may also include a gear coupled to and driven by a shaft of the three-phase AC machine 50. The measured feedback stator currents (Ia-Ic) 41-43 are sensed, sampled and provided to the abc-to-αβ transformation module 60 as described above.

Figure 2A:
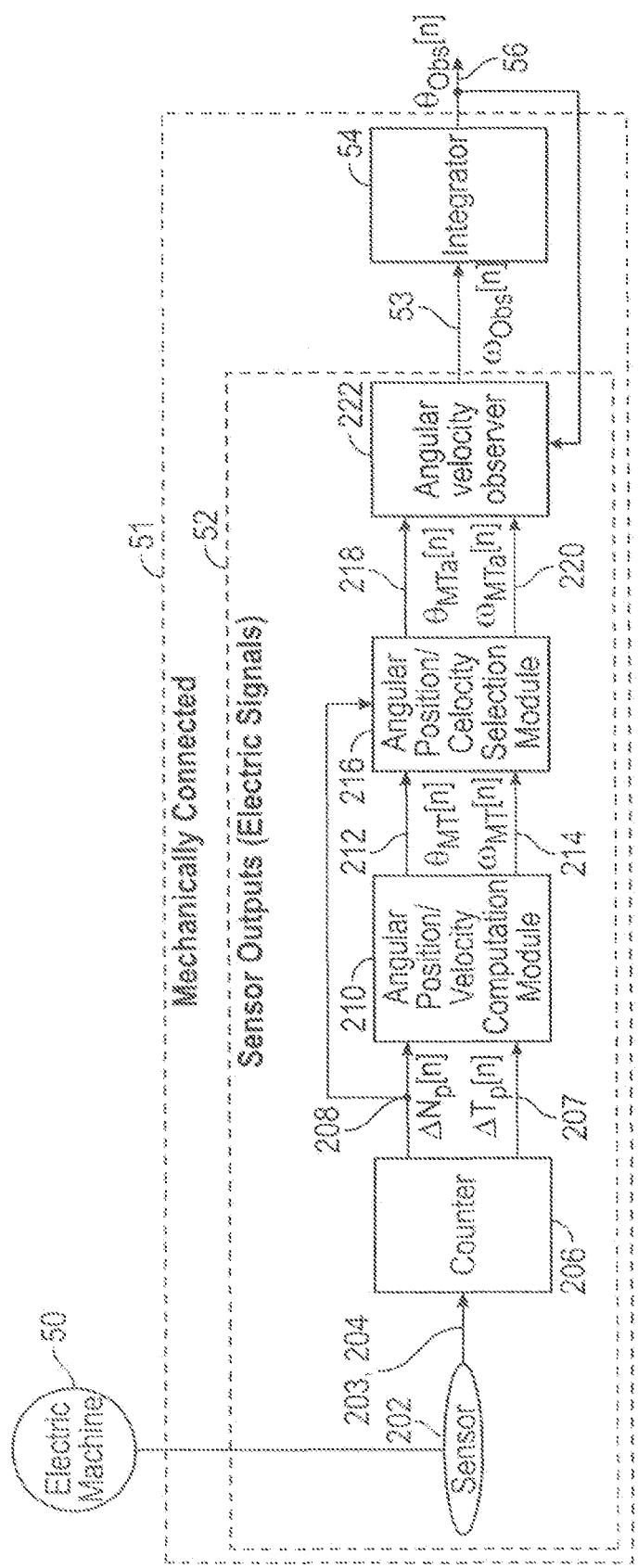
FIG. 2A is a block diagram that illustrates an angular position and velocity estimator in accordance with some of the disclosed embodiments.

FIG. 2A is a block diagram that illustrates an angular position and velocity estimator 51 in accordance with some of the disclosed embodiments.

The angular position and velocity estimator 51 includes an angular velocity observer module 52 and an angular position observer module 54.

The angular velocity observer module 52 includes a sensor 202, a counter 206, an angular position and velocity computation module 210, an angular position and velocity selector module 216, and an angular velocity observer module 222.

The sensor 202 is mechanically coupled to the electric machine 50 such that it is configured to generate sensor output signals 203, 204 that include information regarding angular velocity and angular position of the rotor from the machine 50. In one implementation, an example of which will be described below with reference to FIG. 4, the sensor 202 outputs a first sensor output signal 203 (e.g., on channel A) that includes a sequence of pulses (referred to below as "first" pulses), and a second sensor output signal 204 (e.g., on channel B) that includes a sequence of pulses (referred to below as "second" pulses) that are phase shifted with respect to the first pulses (e.g., in one implementation the second pulses are 90 degree phase shifted from the first pulses). As will be explained below, information from either (or both) sequence (s) of pulses can be used to determine an estimated angular velocity and/or angular position of the rotor. Further, it is noted that in one embodiment, the sensor 202 can be a low resolution sensor. In this regard, its noted that one revolution is 360 degrees. The resolution of the sensor refers to the minimum amount of the angle that the sensor can differentiate. For example, if a sensor can differentiate between 10 degrees and 11 degrees, but cannot differentiate between 10 degrees and 10.9 degrees, the resolution of the sensor is 1 degree. The resolution is high when the minimum value is small, and vice-versa. As such, the term low resolution means that the sensor cannot recognize a small changes in the position of the rotor.

In general, the counter 206 counts the number of pulses in one or more input signals and generates one or more output signals that can be used to determine angular velocity and angular position of the rotor. In the embodiment illustrated, the counter 206 configured to receive the sensor output signals 203, 204. Based on at least one of the sensor output signals 203, 204, the counter 206 is configured to generate counter output signals 207, 208, which, in one embodiment, include: (1) a first counter output signal 207, and (2) a second counter output signal 208. In other words, the information ($\Delta T_p[n]$, $\Delta N_p[n]$) included in the counter output signals 207, 208 can be generated based on the either one of the sensor output signals 203, 204 or both of the sensor output signals 203, 204. The first counter output signal 207 that represents a time duration ($\Delta T_p[n]$) between falling edges (or alternatively rising edges) of the last pulses detected during two consecutive control periods, and the second counter output signal 208 represents a difference ($\Delta N_p[n]$) between a number of pulses detected during two consecutive control periods. An example of the signals 207, 208 will be described below with reference to FIG. 4. It is noted that throughout the application, the value n is an integer that increases with time, and the variable $T_s[n]$ is used to denote a control period, which can be, for example, 100 microseconds.

For example, in one implementation, the second counter output signal 208 represents the difference between the number of first pulses counted during a particular "present" control period and a number of first pulses counted during a previous control period (where the previous control period and the particular present control period are consecutive control periods). Alternatively, in another implementation, the second counter output signal 208 represents the difference between a number of second pulses counted during a particular "present" control period and a number of second pulses counted during a previous control period (where the previous control period and the particular present control period are consecutive control periods).

Further, in one implementation, the first counter output signal 207 represents the time duration between a falling edge of a pulse (e.g., a first pulse or a second pulse) detected during a particular control period and a falling edge of another pulse (e.g., a first pulse or a second pulse) detected during the next consecutive control period after the particular control period. Alternatively, in another implementation, the first counter output signal 207 represents the time duration between a rising edge of a pulse (e.g., a first pulse or a second pulse) detected during a particular control period and a rising edge of another pulse (e.g., a first pulse or a second pulse) detected during the next consecutive control period after the particular control period.

Based on the first counter output signal 207 and/or the second counter output signal 208, the angular computation module 210 is configured to generate a first angular position signal 212 and a first angular velocity signal 214. For example, in one embodiment, the angular computation module 210 generates signal 212 by computing equation (1) below, and generates signal 214 by computing equation (2) below.

$$\theta_{MT}[n]=\theta_{MT}[n-1]+K_{MT}*\Delta N_p[n] \quad (1)$$

$$\omega_{MT}[n]=K_{MT}*\Delta N_p[n]/\Delta T_p[n] \quad (2)$$

In equations (1) and (2) the variable $K_{MT}$ is a constant determined by the sensor parameter, the number of pulses per revolution (how many pulses that sensor generates when the rotor (or equivalently sensor) rotates one revolution (360 degrees). The first angular position signal 212 represents a computed rotor angular position ($\theta_{MT}[n]$) during a present control period, and the first angular velocity signal 214 represents a computed rotor angular velocity ($\omega_{MT}[n]$) during the present control period.

The angular position and velocity selector module 216 receives the second counter output signal 208 as a control input along with the first angular position signal 212 and the first angular velocity signal 214. As will be explained in greater detail below, the angular position and velocity selector module 216 can generate and output a second angular position signal 218 that can have one of three different values (that are described below with reference to steps 330, 335, 350 of FIG. 3), and a second angular velocity signal 220 that can have one of two different values (that are described below with reference to steps 320, 345 of FIG. 3)

To explain further, based on the second counter output signal 208, the angular position and velocity selector module 216 can determine whether the difference ($\Delta N_p$) between the number of pulses detected during the two consecutive control periods is equal to zero.

When the difference ($\Delta N_p$) from the second counter output signal 208 is not equal to zero, the angular position and velocity selector module 216 can output the first angular position signal 212 and the first angular velocity signal 214 computed by 210 as the second angular position signal 218 and the second angular velocity signal 220, respectively, without modification. To explain further, in one implementation, when the difference ($\Delta N_p$) from the second counter output signal 208 is not equal to zero, the angular position and velocity selector module 216 can set another counter (not illustrated) that counts the number of times no pulse was received ($N_{np}[n]$) during the present control period equal to zero (0). The angular position and velocity selector module 216 can then set a first variable ($\theta_{MT1}[n]$) equal to a value ($\theta_{MT}[n]$) of the first angular position signal 212 that was computed during the present control period ($T_s[n]$), and then set the second angular position signal ($\theta_{MTa}[n]$) 218 equal to the first variable ($\theta_{MT1}[n]$). Similarly, the angular position and velocity selector module 216 can set a second variable ($\omega_{MT1}[n]$) equal to a value ($\omega_{MT}[n]$) of the first angular velocity signal 214 that was computed during the present control period ($T_s[n]$), and then set the second angular velocity signal ($\omega_{MTa}[n]$) 220 equal to the second variable ($\omega_{MT1}[n]$).

By contrast, when the difference ($\Delta N_p$) from the second counter output signal 208 is equal to zero, the angular position and velocity selector module 216 is configured to process the first angular position signal 212 to generate and output a second angular position signal 218, and to process the first angular velocity signal 214 to generate and output a second angular velocity signal 220. The second angular position signal 218 that represents an adjusted version of the computed rotor angular position ($\theta_{MTa}[n]$) during the present control period, and the second angular velocity signal 220 that represents an adjusted version of the computed rotor angular velocity ($\omega_{MTa}[n]$) during the present control period.

To explain further, in one implementation, when the difference ($\Delta N_p$) from the second counter output signal 208 is equal to zero, the angular position and velocity selector module 216 can set the number of times no pulse was received ($N_{np}[n]$) during the present control period equal to a sum of one and a number of times no pulse was received during the previous control period ($N_{np}[n-1]$). The angular position and velocity selector module 216 can then set a first variable ($\omega_{MT1}[n]$) equal to a value ($\omega_{MTa}[n-1]$) of the second angular velocity signal 220 that was computed during the previous control period, and then set the second angular velocity signal ($\omega_{MTa}$) 220 equal to the first variable ($\omega_{MT1}[n]$). As such, in this case, the second angular velocity signal 220 will be set to a value equal to the adjusted version of the computed rotor angular velocity ($\omega_{MTa}[n-1]$) during a previous control period.

As will be described below in greater detail with reference to FIG. 3, when the difference ($\Delta N_p$) from the second counter output signal 208 is equal to zero, the angular position and velocity selector module 216 is configured to output the second angular position signal 218 that represents the adjusted version of the computed rotor angular position ($\theta_{MTa}[n]$) during the present control period. In one particular implementation, the second angular position signal 218 computed by the angular position and velocity selector module 216 has a value computed as a sum of (1) a product ($\omega_{MT1}[n] \times T_s[n]$), and (2) a value (e.g., either $\theta_{MT}[n-1]$ or $\theta_{MTa}[n-1]$). For example, in one embodiment, the product can be a product of (1a) first variable ($\omega_{MT1}[n]$) equal to a value ($\omega_{MTa}[n-1]$) of the second angular velocity signal 220 that was computed during the previous control period, and (1b) the present control period ($T_s[n]$), and the value is either: (2a) the computed rotor angular position ($\theta_{MT}[n-1]$) during the previous control period when the number of times no pulse was received ($N_{np}[n]$) is equal to one, or (2b) the adjusted version of the computed rotor angular position ($\theta_{MTa}[n-1]$) during the previous control period when the number of times no pulse was received ($N_{np}[n]$) is not equal to one.

For example, in one embodiment, the angular position and velocity selector module 216 can determine whether the number of times no pulse was received ($N_{np}[n]$) during the present control period is equal to one (1).

When the number of times no pulse was received ($N_{np}[n]$) during the present control period is equal to one, the angular position and velocity selector module 216 can set a second variable ($\theta_{MT1}[n]$) equal to a "first" sum, and then set the second angular position signal ($\theta_{MTa}$) 218 equal to the second variable ($\theta_{MT1}[n]$). In this case, the first sum is the sum of (1) a first product, and (2) a value ($\theta_{MT}[n-1]$) of the first angular position signal 212 that was computed during the previous control period. The first product is the product of the present control period ($T_s[n]$) and the value of the first variable ($\omega_{MT1}[n]$) of the second angular velocity signal 220 that was computed during the previous control period.

By contrast, when the number of times no pulse was received ($N_{np}[n]$) during the present control period is not equal to one, the angular position and velocity selector module 216 can set the second variable ($\theta_{MT1}[n]$) equal to a second sum, and then set the second angular position signal ($\theta_{MTa}[n]$) 218 equal to the second variable ($\theta_{MT1}[n]$). The second sum is the sum of (1) the first product (as described above), and (2) a value ($\theta_{MTa}[n-1]$) of the second angular position signal 218 that was computed during the previous control period.

The angular velocity observer module 222 is coupled to the angular position and velocity selector module 216 and the angular position observer module 54. As will be described below, the angular velocity observer module 222 can generate an observed angular velocity signal 53 based on the second angular position signal 218, the second angular velocity signal 220 and a signal 56. The observed angular velocity signal 53 represents an observed rotor angular velocity ($\omega_{Obs}[n]$) of the electric machine during the present control period.

Based on the signal 53, the angular position observer module 54 generates and outputs the observed angular position signal 56 by integrating observed angular velocity signal 53 over the time. Signal 56 represents an observed rotor angular position ($\theta_{Obs}[n]$) of the electric machine during the present control period.

Figure 2B:
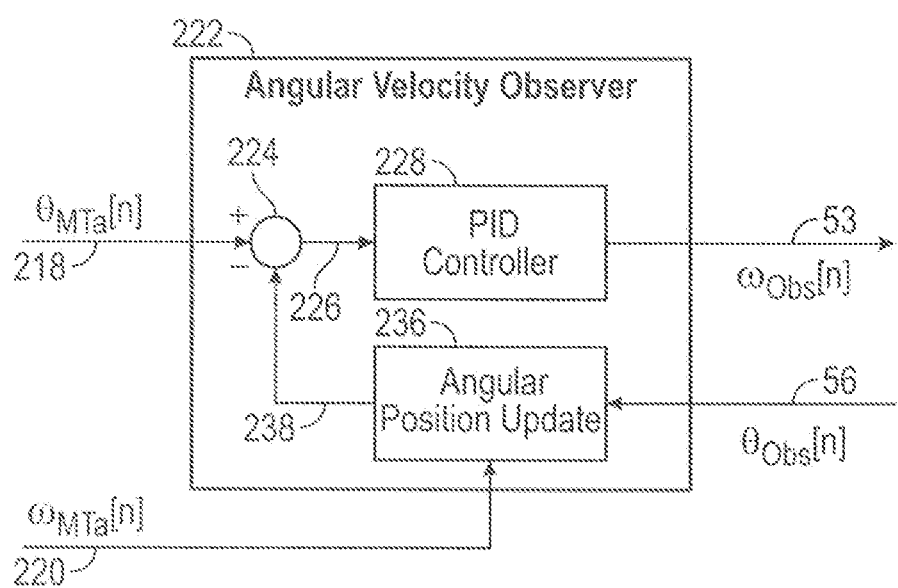
FIG. 2B is a block diagram that illustrates an angular velocity observer in accordance with one implementation of some of the disclosed embodiments.

FIG. 2B is a block diagram that illustrates an angular velocity observer 222 in accordance with one implementation of some of the disclosed embodiments. In this implementation, the angular velocity observer module 222 includes a subtraction module 224, a proportional-integral-derivative controller (PID) controller module 228, and an angular position update module 236.

The angular position update module 236 generates the angular position update signal 238 based on the signal 220 (that represents the adjusted version of computed rotor angular velocity ($\omega_{MTa}[n]$) during the present control period) and the signal 56 (that represents the observed rotor angular position ($\theta_{Obs}[n]$) during the present control period).

The subtraction module 224 generates a difference signal 226 by subtracting the angular position update signal 238 from the signal 218 (that represents the adjusted version of computed rotor angular position ($\theta_{MTa}[n]$) during the present control period). The difference signal 226 represents the difference between the signal 218 and the angular position update signal 238.

The PID controller module 228 is a feedback controller that attempts to minimize the difference signal 226 by adjusting process control inputs as is known in the art. In this implementation, the PID controller module 228 receives the difference signal 226, and outputs a signal 53 that is generated based on the difference signal 226. The signal 53 represents the observed rotor angular velocity ($\omega_{Obs}[n]$) during the present control period.

Figure 3:
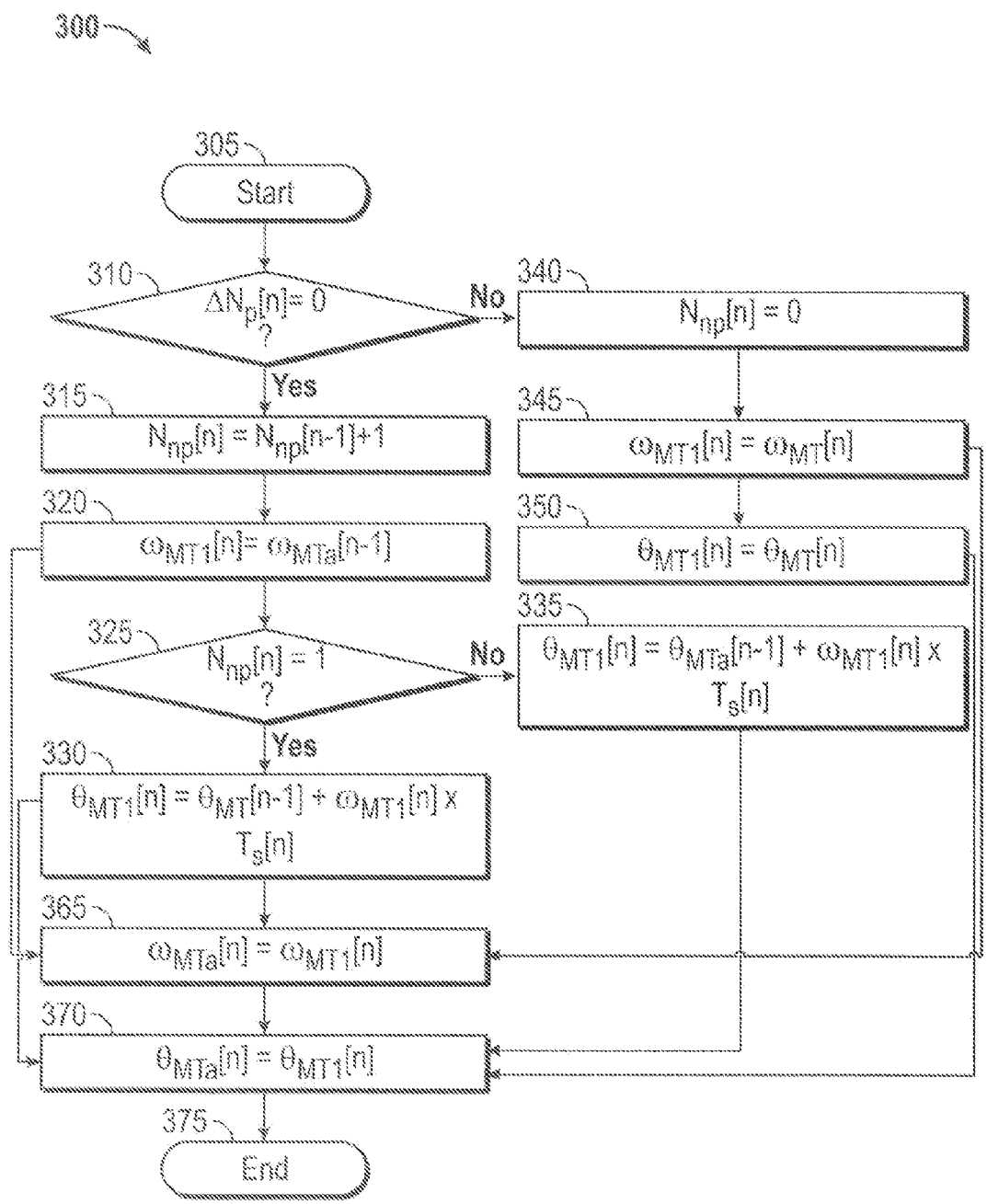
FIG. 3 is a flowchart that illustrates an angular position and velocity estimation method in accordance with some of the disclosed embodiments.

FIG. 3 is a flowchart that illustrates an angular position and velocity estimation method 300 in accordance with some of the disclosed embodiments. The method 300 begins at 305, and at 310, the angular position and velocity selector module 216 can determine whether the difference ($\Delta N_p$) between the number of pulses detected during the two consecutive control periods is equal to zero (e.g., determine whether the difference ($\Delta N_p$) between the number of pulses counted during the present control period and the previous control period is equal to zero.

When the difference ($\Delta N_p$) from the second counter output signal 208 is equal to zero, method 300 proceeds to 315, where the angular position and velocity selector module 216 can set the number of times no pulse was received ($N_{np}[n]$) during the present control period equal to a sum of one and a number of times no pulse was received during the previous control period ($N_{np}[n-1]$).

At 320, the angular position and velocity selector module 216 can set a first variable ($\omega_{MT1}[n]$) equal to a value ($\omega_{MTa}[n-1]$) of the second angular velocity signal 220 that was computed during the previous control period. At 325, the angular position and velocity selector module 216 can determine whether the number of times no pulse was received ($N_{np}[n]$) during the present control period is equal to one (1).

When the number of times no pulse was received ($N_{np}[n]$) during the present control period is equal to one, the method 300 proceeds to 330, wherein the angular position and velocity selector module 216 can set a second variable ($\theta_{MT1}[n]$) equal to a "first" sum. In one embodiment, the first product is the product of the present control period ($T_s[n]$) and the value of the first variable ($\omega_{MT1}[n]$) of the second angular velocity signal 220 that was computed during the previous control period, and the first sum is the sum of (1) a "first" product, and (2) a value ($\theta_{MT}[n-1]$) of the first angular position signal 212 that was computed during the previous control period. By contrast, when the number of times no pulse was received ($N_{np}[n]$) during the present control period is not equal to one, the method 300 proceeds to 335, wherein the angular position and velocity selector module 216 can set the second variable ($\theta_{MT1}[n]$) equal to a "second" sum. In one embodiment, the second sum is the sum of (1) the first product, and (2) a value ($\theta_{MTa}[n-1]$) of the second angular position signal 218 that was computed during the previous control period.

When the difference ($\Delta N_p$) from the second counter output signal 208 is not equal to zero, method 300 proceeds to 340, where the angular position and velocity selector module 216 can set the number of times no pulse was received ($N_{np}[n]$) during the present control period equal to zero (0). At 345, the angular position and velocity selector module 216 can set a first variable ($\omega_{MT1}[n]$) equal to a value ($\omega_{MT}[n]$) of the first angular velocity signal 214 that was computed during the present control period ($T_s[n]$), and at 350, the angular position and velocity selector module 216 can set the second variable ($\theta_{MT1}[n]$) equal to a value ($\theta_{MT}[n]$) of the first angular position signal 212 that was computed during the present control period ($T_s[n]$).

At 365, the angular position and velocity selector module 216 can set the second angular velocity signal ($\omega_{MTa}[n]$) 220 equal to the value of the first variable ($\omega_{MT1}[n]$), which can be either the value from 320 or 345. In other words, when the method 300 follows path 315, 320, 325, 330/335, the angular position and velocity selector module 216 can set the second angular velocity signal ($\omega_{MTa}[n]$) 220 equal to the value of the first variable ($\omega_{MT1}[n]$), which is computed as described above with reference to 320. By contrast, when the method 300 follows path 340, 345, 350, the angular position and velocity selector module 216 can set the second angular velocity signal ($\omega_{MTa}[n]$) 220 equal to the value of the first variable ($\omega_{MT1}[n]$), which is computed as described above with reference to 345.

At 370, the angular position and velocity selector module 216 can set the second angular position signal ($\theta_{MTa}[n]$) 218 equal to the second variable ($\theta_{MT1}[n]$), which can be either the value from 330, 335 or 350. In other words, when the method 300 follows path 315, 320, 325, 330, the angular position and velocity selector module 216 can set the second angular position signal ($\theta_{MTa}[n]$) 218 equal to the second variable ($\theta_{MTa}[n]$) which is equal to the first sum (as described above with reference to 330). By contrast, when the method 300 follows path 315, 320, 325, 335, the angular position and velocity selector module 216 can set the second angular position signal ($\theta_{MTa}[n]$) 218 equal to the second variable ($\theta_{MT1}[n]$) which is equal to the second sum (as described above with reference to 335). When the method 300 follows path 340, 345, 350, the angular position and velocity selector module 216 can set the second angular position signal ($\theta_{MTa}[n]$) 218 equal to the second variable ($\theta_{MT1}[n]$) which is equal to a value ($\theta_{MT}[n]$) of the first angular position signal 212 that was computed during the present control period ($T_s[n]$) (as described above with reference to 350).

The method 300 then ends at 375.

Figure 4:
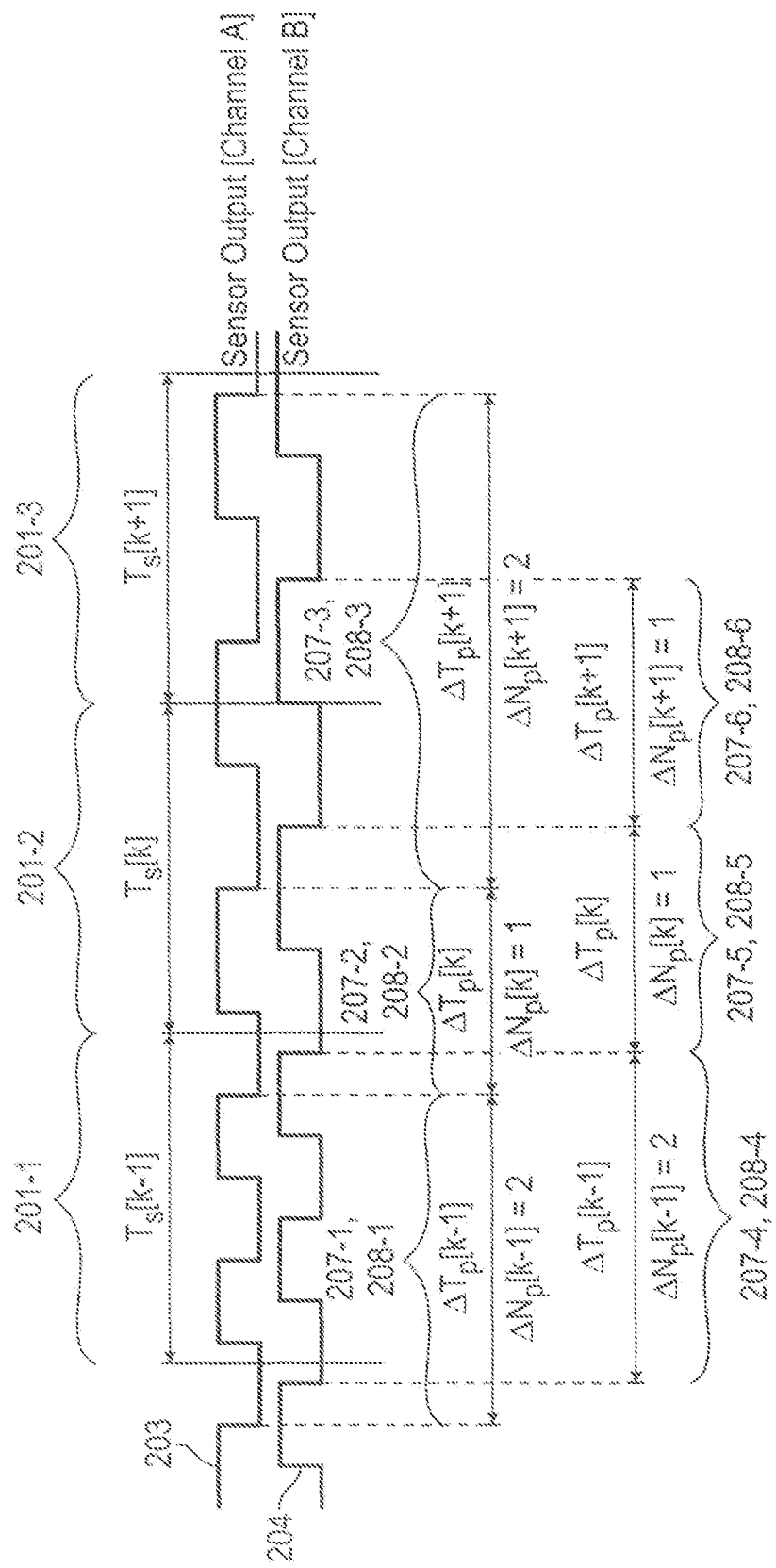
FIG. 4 are graphs that illustrate output signals generated by the sensor and corresponding output signals generated by the counter during three control periods.

FIG. 4 are graphs that illustrate output signals 203, 204 generated by the sensor 202 and corresponding output signals 207, 208 generated by the counter 206 during three control periods ($T_s[k-1]$, $T_s[k]$, $T_s[k+1]$) 201 as the variable n increase from k-1 to k+1. In particular, FIG. 4 illustrates graphs of a first sensor output signal 203 and a second sensor output signal 204 as a function of time along with corresponding information for a second counter output signal 208 and a first counter output signal 207 that would be generated by the counter 206 in accordance with one implementation of the disclosed embodiments.

FIG. 4 illustrates three control periods ($T_s[k-1]$, $T_s[k]$, $T_s[k+1]$) as the variable n increase from k-1 to k+1. These will be referred to below as a previous control period ($T_s[k-1]$), a present control period ($T_s[k]$), and a next control period ($T_s[k+1]$).

As illustrated in FIG. 4, during the previous control period ($T_s[k-1]$), the first sensor output signal 203 (output on channel A of the sensor 202) will cause the counter 206 to output a second counter output signal 208-1 in which the difference ($\Delta N_p[k-1]$) between the number of "first" pulses detected during two consecutive control periods is equal to two (2), and a first counter output signal 207-1 having a time duration ($\Delta T_p[k-1]$) between falling edges of the last first pulses detected during two consecutive control periods ($T_s[k-2]$, $T_s[k-1]$).

Similarly, during the previous control period ($T_s[k-1]$), the second sensor output signal 204 (output on channel B of the sensor 202) will cause the counter 206 to output a second counter output signal 208-4 in which the difference ($\Delta N_p[k-1]$) between the number of "second" pulses detected during two consecutive control periods is equal to two (2), and a first counter output signal 207-4 having a time duration ($\Delta T_p[k-1]$) between falling edges of the last second pulses detected during two consecutive control periods ($T_s[k-2]$, $T_s[k-1]$). Its noted that although the time durations ($\Delta T_p[k-1]$) are determined between the last two falling edges of the (first or second) pulses during each control period ($T_s$), in alternative embodiments, the time durations ($\Delta T_p[k-1]$) could be determined between the last rising edges of the (first or second) pulses during each control period ($T_s$).

During the present control period ($T_s[k]$), the first sensor output signal 203 (output on channel A of the sensor 202) will cause the counter 206 to output a second counter output signal 208-2 in which the difference ($\Delta N_p[k]$) between the number of "first" pulses detected during two consecutive control periods is equal to one (1), and a first counter output signal 208-2 having a time duration ($\Delta T_p[k]$) between falling edges of the last first pulses detected during two consecutive control periods ($T_s[k-1]$, $T_s[k]$).

Similarly, during the present control period ($T_s[k]$), the second sensor output signal 204 (output on channel B of the sensor 202) will cause the counter 206 to output a second counter output signal 208-5 in which the difference ($\Delta N_p[k]$) between the number of "second" pulses detected during two consecutive control periods is equal to one (1), and a first counter output signal 207-5 having a time duration ($\Delta T_p[k]$) between falling edges of the last second pulses detected during two consecutive control periods ($T_s[k-1]$, $T_s[k]$).

During the next control period ($T_s[k+1]$), the first sensor output signal 203 (output on channel A of the sensor 202) will cause the counter 206 to output a second counter output signal 208-3 in which the difference ($\Delta N_p[k+1]$) between the number of "first" pulses detected during two consecutive control periods is equal to two (2), and a first counter output signal 207-3 having a time duration ($\Delta T_p[k+1]$) between falling edges of the last first pulses detected during two consecutive control periods ($T_s[k]$, $T_s[k+1]$).

By contrast, during the next control period ($T_s[k+1]$), the second sensor output signal 204 (output on channel B of the sensor 202) will cause the counter 206 to output a second counter output signal 208-6 in which the difference ($\Delta N_p[k+1]$) between the number of "second" pulses detected during two consecutive control periods is equal to one (1), and a first counter output signal 207-6 having a time duration ($\Delta T_p[k+1]$) between falling edges of the last second pulses detected during two consecutive control periods ($T_s[k]$, $T_s[k+1]$)

FIG. 5-10 are simulations of actual rotor angular position and rotor angular position estimation error under different conditions.

FIG. 5 is a graph 510 that illustrates actual rotor angular position in degrees as a function of time in seconds. FIG. 6 is a graph 610 that illustrates rotor angular position estimation error in degrees as a function of time in seconds when a conventional angular velocity observer is used to estimate rotor angular position as the actual rotor angular position varies as shown in FIG. 5.

Figure 7:
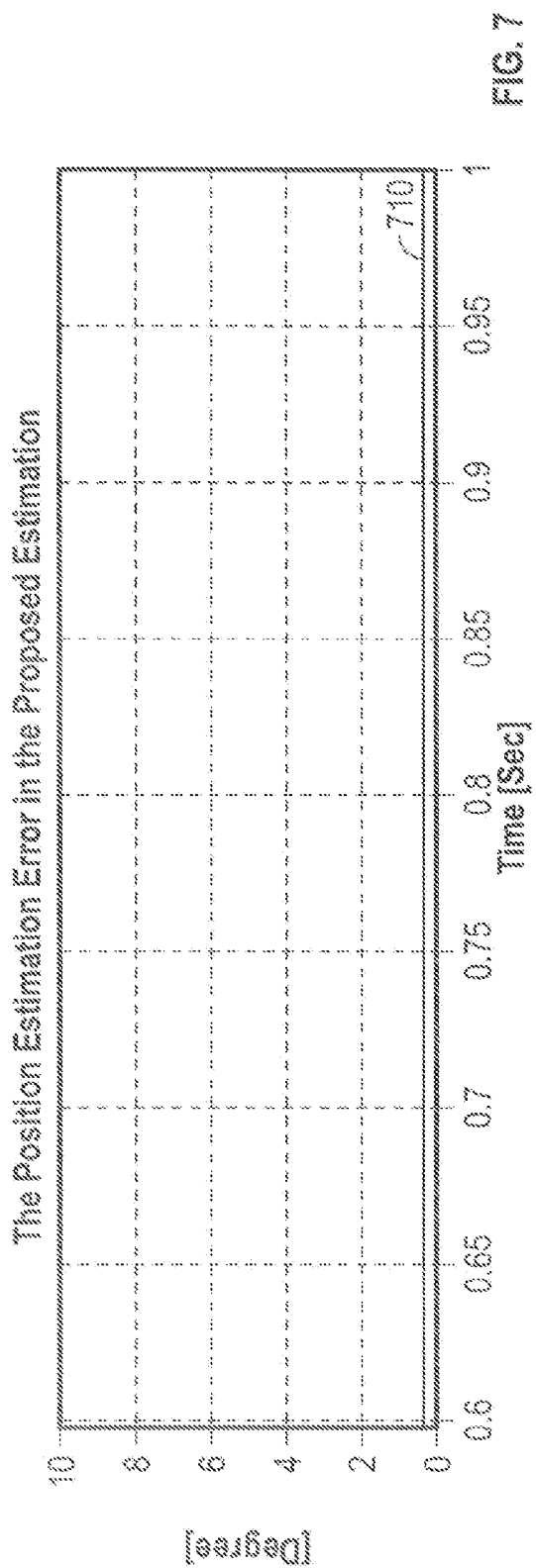
FIG. 7 is a graph that illustrates rotor angular position estimation error in degrees as a function of time in seconds when an angular velocity observer in accordance with some of the disclosed embodiments is used to estimate rotor angular position as the actual rotor angular position varies as shown in FIG. 5.

FIG. 7 is a graph 710 that illustrates rotor angular position estimation error in degrees as a function of time in seconds when am angular velocity observer in accordance with some of the disclosed embodiments is used to estimate rotor angular position as the actual rotor angular position varies as shown in FIG. 5.

FIGS. 6 and 7 illustrate that the rotor angular position estimation error is greatly reduced when an angular velocity observer in accordance with some of the disclosed embodiments is used to estimate rotor angular position.

Figure 8:
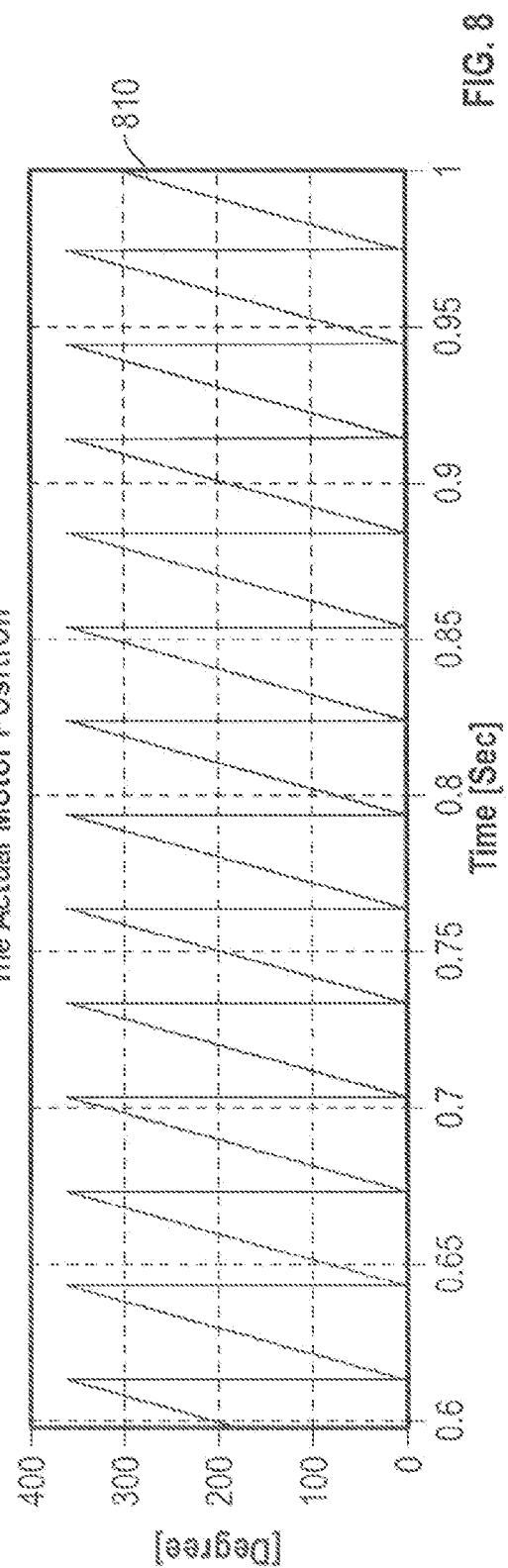
FIG. 8 is a graph that illustrates actual rotor angular position in degrees as a function of time in seconds.

FIG. 8 is a graph 810 that illustrates actual rotor angular position in degrees as a function of time in seconds.

Figure 9:
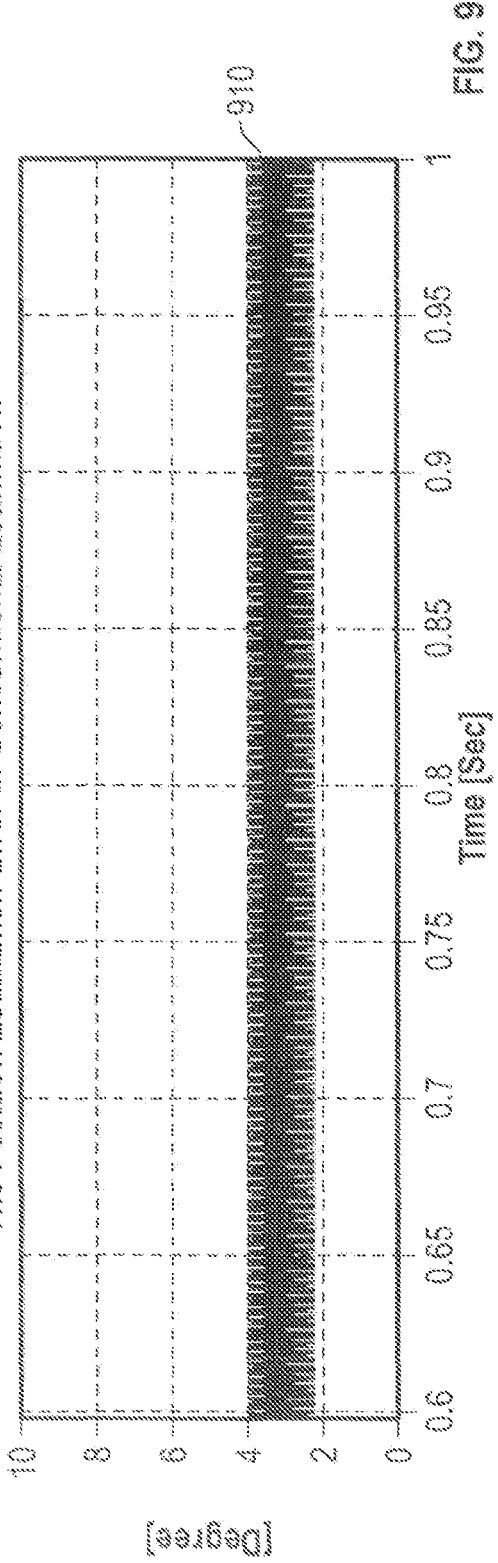
FIG. 9 is a graph that illustrates rotor angular position estimation error in degrees as a function of time in seconds when a conventional angular velocity observer is used to estimate rotor angular position as the actual rotor angular position varies as shown in FIG. 8.

FIG. 9 is a graph 910 that illustrates rotor angular position estimation error in degrees as a function of time in seconds when a conventional angular velocity observer is used to estimate rotor angular position as the actual rotor angular position varies as shown in FIG. 8.

Figure 10:
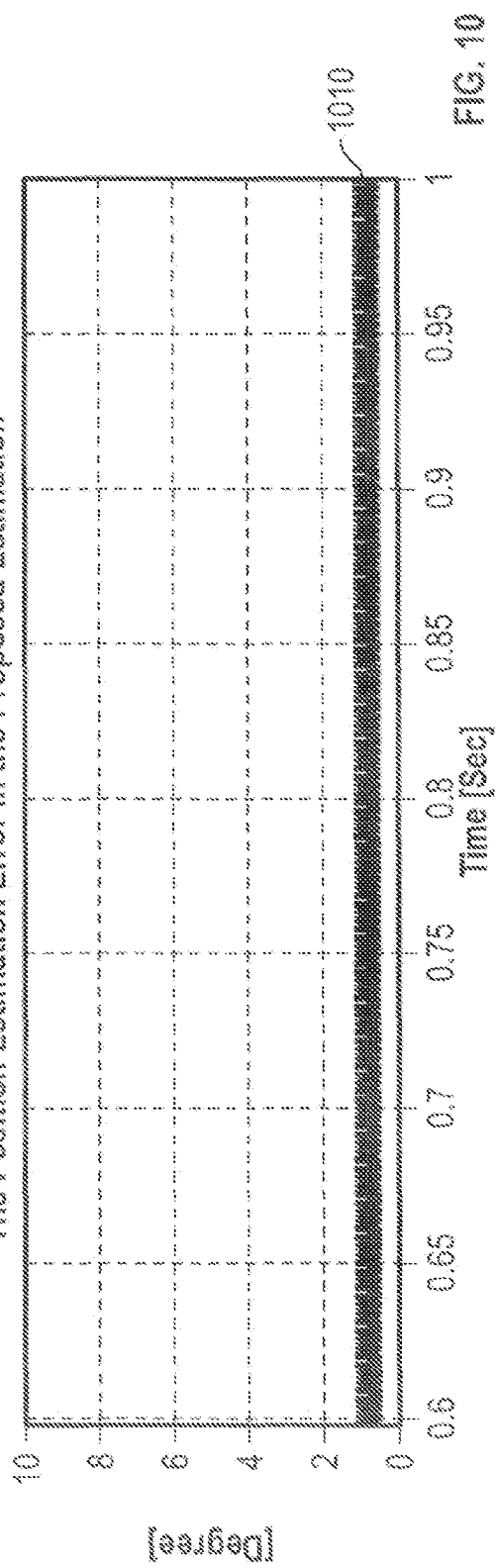
FIG. 10 is a graph that illustrates rotor angular position estimation error in degrees as a function of time in seconds when an angular velocity observer in accordance with some of the disclosed embodiments is used to estimate rotor angular position as the actual rotor angular position varies as shown in FIG. 8.

FIG. 10 is a graph 1010 that illustrates rotor angular position estimation error in degrees as a function of time in seconds when an angular velocity observer in accordance with some of the disclosed embodiments is used to estimate rotor angular position as the actual rotor angular position varies as shown in FIG. 8.

FIGS. 9 and 10 illustrate that the rotor angular position estimation error is greatly reduced when an angular velocity observer in accordance with some of the disclosed embodiments is used to estimate rotor angular position.

A comparison of FIG. 7 versus FIG. 10 also illustrates that the rotor angular position estimation error is greater when the rate at which rotor angular position is changing (i.e., rotor angular velocity) is lower.

Thus, in accordance with the disclosed embodiments, improved methods and systems for estimating angular position and velocity of an electric machine's rotor are provided. The disclosed methods and systems can improve the quality of the estimated angular position and the estimated angular velocity since errors in those estimations are reduced. This helps improve control performance (e.g., torque accuracy). The higher the angular position and/or velocity estimation errors, the more discrepancy there will be between the machine output torque and the commanded torque. Alternatively, the resolution specification of sensors can be reduced while achieving same performance as with a higher resolution sensor. As such, the cost of the system can be reduced since less expensive, low resolution sensors can be employed.

Those of skill in the art would further appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for estimating an angular position and angular velocity of a rotor of an electric machine, comprising:

computing, based on a first counter output signal and a second counter output signal, a first angular position signal that represents a computed rotor angular position ($\theta_{MT}[n]$) during a present control period and a first angular velocity signal that represents a computed rotor angular velocity ($\omega_{MT}[n]$) during the present control period; and determining, based on the second counter output signal, whether a difference ($\Delta N_p[n]$) between a number of pulses detected during two consecutive control periods is equal to zero, wherein the two consecutive control periods include a present control period and a previous control period; and when the difference ($\Delta N_p[n]$) determined from the second counter output signal is determined to be equal to zero, further comprising:

generating a second angular velocity signal that represents an adjusted version of the computed rotor angular velocity ($\omega_{MTa}[n]$) during the present control period by setting the second angular velocity signal equal to a value ($\omega_{MTa}[n-1]$) of the second angular velocity signal that was computed during the previous control period.

2. A method according to claim 1, when the difference ($\Delta N_p$) from the second counter output signal is to zero, further comprising:

setting a number of times no pulse was received ($N_{np}[n]$) during the present control period equal to a sum of one and a number of times no pulse was received during the previous control period ($N_{np}[n-1]$);

determining whether the number of times no pulse was received ($N_{np}[n]$) during the present control period is equal to one (1); and generating a second angular position signal that represents an adjusted version of the computed rotor angular position ($\theta_{MTa}[n]$) during the present control period.

3. A method according to claim 2, when the number of times no pulse was received ($N_{np}[n]$) during the present control period is equal to one, wherein the step of generating the second angular position signal that represents the adjusted version of the computed rotor angular position ($\theta_{MTa})[n]$) during the present control period, comprises:

setting the second angular position signal ($\theta_{MTa}[n]$) equal to a first sum, wherein the first sum comprises the sum of: (1) a first product, and (2) a value ($\theta_{MT}[n-1]$) of a first angular position signal that was computed during the previous control period.

4. A method according to claim 3, when the number of times no pulse was received ($N_{np}[n]$) during the present control period is not equal to one, wherein the step of generating the second angular position signal that represents the adjusted version of the computed rotor angular position ($\theta_{MTa})[n]$) during the present control period, comprises:

setting the second angular position signal ($\theta_{MTa}[n]$) equal to a second sum, wherein the second sum comprises the sum of: (1) the first product, and (2) a value ($\theta_{MTa}[n-1]$) of the second angular position signal that was computed during the previous control period that represents the adjusted version of the computed rotor angular position ($\theta_{MTa}[n]$) during the previous control period.

5. A method according to claim 4, wherein the first product is computed based on the present control period ($T_s[n]$) and a value of a first variable ($\omega_{MT1}[n]$) that is equal to a value ($\omega_{MTa}[n-1]$) of the second angular velocity signal that was computed during the previous control period.

6. A method according to claim 1, when the difference ($\Delta N_p[n]$) from the second counter output signal is not equal to zero, further comprising:

setting the number of times no pulse was received ($N_{np}[n]$) during the present control period to zero (0);

outputting the first angular position signal as the second angular position signal without modification by: setting the second variable ($\theta_{MT1}[n]$) equal to a value ($\theta_{MT}[n]$) of the first angular position signal that was computed during the present control period ($T_s[n]$), and then setting the second angular position signal ($\theta_{MTa}[n]$) equal to the value of the second variable ($\theta_{MT1}[n]$); and outputting the first angular velocity signal as the second angular velocity signal without modification by: setting the first variable ($\omega_{MT1}[n]$) equal to a value ($\omega_{MT}[n]$) of the first angular velocity signal that was computed during the present control period ($T_s[n]$), and then setting the second angular velocity signal ($\omega_{MTa}[n]$) equal to the value of the first variable ($\omega_{MT1}[n]$).

7. A method according to claim 1, further comprising:

generating sensor output signals, that each comprise pulses; and generating, based on at least one of the sensor output signals, a second counter output signal that represents a difference ($\Delta N_p[n]$) between a number of pulses detected during two consecutive control periods, and (2) a first counter output signal that represents a time duration ($\Delta T_p[n]$) between corresponding edges of the last pulses detected during two consecutive control periods.

8. A system configured to estimate an angular position and angular velocity of a rotor of an electric machine, comprising:

a sensor, mechanically coupled to the electric machine, the sensor being configured to generate, sensor output signals, that each comprise pulses;

a counter configured to receive the sensor output signals, and to generate, based on at least one of the sensor output signals: (1) a second counter output signal that represents a difference ($\Delta N_p[n]$) between a number of pulses detected during two consecutive control periods, and (2) a first counter output signal that represents a time duration ($\Delta T_p[n]$) between corresponding edges of the last pulses detected during two consecutive control periods;

an angular computation module that is configured to generate, based on the first counter output signal and the second counter output signal, a first angular position signal that represents a computed rotor angular position ($\theta_{MT}[n]$) during a present control period; and an angular position and velocity selector module configured to generate, when the second counter output signal is equal to zero, a second angular position signal that represents an adjusted version of the computed rotor angular position ($\theta_{MTa}[n]$) during the present control period.

9. A system according to claim 8, when the second counter output signal is equal to zero, wherein the angular position and velocity selector module is configured to perform a linear interpolation based on the first angular position signal to generate the second angular position signal that represents the adjusted version of the computed rotor angular position ($\theta_{MTa})[n]$) during the present control period.

10. A system according to claim 8, wherein the second angular position signal has a value computed as a sum of:

a product of (1) first variable ($\omega_{MT1}[n]$) equal to a value ($\omega_{MTa}[n-1]$) of the second angular velocity signal that was computed during the previous control period, and (2) the present control period ($T_s[n]$), and either:

the computed rotor angular position ($\theta_{MT}[n-1]$) during the previous control period when the number of times no pulse was received ($N_p[n]$) is equal to one, or the adjusted version of the computed rotor angular position ($\theta_{MTa}[n-1]$) during the previous control period when the number of times no pulse was received ($N_{np}[n]$) is not equal to one.

11. A system according to claim 8, wherein the angular computation module is further configured to generate, based on the first counter output signal and the second counter output signal: a first angular velocity signal that represents the computed rotor angular velocity ($\omega_{MT}[n]$) during the present control period, and when the second counter output signal is equal to zero, wherein the angular position and velocity selector module is configured to generate a second angular velocity signal that represents an adjusted version of the computed rotor angular velocity ($\omega_{MTa}[n]$) during the present control period, and that has a value equal to the adjusted version of the computed rotor angular velocity ($\omega_{MTa}[n-1]$) during a previous control period.

12. A system according to claim 10, wherein the sum is either a first sum or a second sum, wherein the product is either a first product or a second product, and wherein the angular position and velocity selector module is configured to:
    determine whether the difference ($\Delta N_p$) between the number of pulses detected during the two consecutive control periods is equal to zero; and
    when the difference ($\Delta N_p$) from the second counter output signal is equal to zero:
    set the number of times no pulse was received ($N_{np}[n]$) during the present control period equal to a sum of one and a number of times no pulse was received during the previous control period ($N_{np}[n-1]$);
    set a first variable ($\omega_{MT1}[n]$) equal to a value ($\omega_{MTa}[n-1]$) of the second angular velocity signal that was computed during the previous control period, and then set the second angular velocity signal ($\omega_{MTa}[n]$) equal to the first variable ($\omega_{MT1}[n]$);
    determine whether the number of times no pulse was received ($N_{np}[n]$) during the present control period is equal to one (1); and
    either:
    set a second variable ($\theta_{MT1}[n]$) equal to the first sum when the number of times no pulse was received ($N_{np}[n]$) during the present control period is equal to one, and then set the second angular position signal ($\theta_{MTa}[n]$) equal to the value of the second variable ($\theta_{MT1}[n]$), wherein the first sum comprises the sum of (1) the first product, and (2) a value ($\theta_{MT}[n-1]$) of the first angular position signal that was computed during the previous control period; or
    set the second variable ($\theta_{MT1}[n]$) equal to the second sum when the number of times no pulse was received ($N_{np}[n]$) during the present control period is not equal to one, and then set the second angular position signal ($\theta_{MTa}$) equal to the value of the second variable ($\theta_{MT1}[n]$), wherein the second sum comprises the sum of (1) the first product, and (2) a value ($\theta_{MTa}[n-1]$) of the second angular position signal that was computed during the previous control period,
    wherein the first product is the product of the present control period ($T_s[n]$) and the value of the first variable ($\omega_{MT1}[n]$) that is equal to a value ($\omega_{MTa}[n-1]$) of the second angular velocity signal that was computed during the previous control period.

13. A system according to claim 12, when the difference ($\Delta N_p$) from the second counter output signal is not equal to zero, wherein the angular position and velocity selector module is configured to output the first angular position signal and the first angular velocity signal computed by as the second angular position signal and the second angular velocity signal, respectively, without modification.

14. A system according to claim 13, when the difference ($\Delta N_p$) from the second counter output signal is not equal to zero, wherein the angular position and velocity selector module is configured to:
    set the number of times no pulse was received ($N_{np}[n]$) during the present control period to zero (0);
    set the first variable ($\omega_{MT1}[n]$) equal to a value ($\omega_{MT}[n]$) of the first angular velocity signal that was computed during the present control period ($T_s[n]$), and then set the second angular velocity signal ($\omega_{MTa}[n]$) equal to the value of the first variable ($\omega_{MT1}[n]$); and
    set the second variable ($\theta_{MT1}[n]$) equal to a value ($\theta_{MT}[n]$) of the first angular position signal that was computed during the present control period ($T_s[n]$), and then setting the second angular position signal ($\theta_{MTa}[n]$) equal to the value of the second variable ($\theta_{MT1}[n]$).

15. A system according to claim 10, further comprising:
    an angular velocity observer module coupled to the angular position and velocity selector module and being configured to generate an observed angular velocity signal based on the second angular position signal and the second angular velocity signal, wherein the observed angular velocity signal represents an observed rotor angular velocity ($\omega_{Obs}[n]$) of the electric machine during the present control period.

16. A system according to claim 15, further comprising:
    an angular position observer module coupled to the angular velocity observer module and being configured to generate an observed angular position signal by integrating the observed angular velocity signal, wherein the observed angular position signal represents an observed rotor angular position ($\theta_{Obs}[n]$) of the electric machine during the present control period.

17. A system according to claim 15, wherein the angular velocity observer module comprises:
    an angular position update module that is configured to generate an angular position update signal based on the observed angular position signal;
    a subtraction module that is configured to generate a difference signal by subtracting the angular position update signal from the second angular position; and
    a proportional-integral-derivative (PID) controller module that receives the difference signal, and generates the observed angular velocity signal based on the difference signal.

18. A method implemented at a processor, the method comprising:
    determining, at the processor based on a first counter output signal, whether a difference ($\Delta N_p$) between a number of pulses detected during two consecutive control periods is equal to zero, wherein the two consecutive control periods include a present control period and a previous control period; and
    when the difference ($\Delta N_p$) is determined to be equal to zero, further comprising:
    setting, at the processor, a number of times no pulse was received ($N_{np}[n]$) during the present control period equal to a sum of one and a number of times no pulse was received during the previous control period ($N_{np}[n-1]$);
    setting, at the processor, a second angular velocity signal ($\omega_{MTa}[n]$) equal to a value ($\omega_{MTa}[n-1]$) of a second angular velocity signal ($\omega_{MTa}[n]$) that was computed during the previous control period;

determining, at the processor, whether the number of times no pulse was received ($N_{np}[n]$) during the present control period is equal to one (1); and when the number of times no pulse was received ($N_{np}[n]$) during the present control period is equal to one: setting, at the processor, the second angular position signal ($\theta_{MTa}[n]$) equal to a first sum that comprises the sum of: (1) a first product, and (2) a value ($\Delta_{MT}[n-1]$) of a first angular position signal that was computed during the previous control period; or when the number of times no pulse was received ($N_{np}[n]$) during the present control period is not equal to one: setting, at the processor, the second angular position signal ($\theta_{MTa}[n]$) equal to a second sum that comprises the sum of (1) the first product, and (2) a value ($\theta_{MTa}[n-1]$) of the second angular position signal that was computed during the previous control period that represents the adjusted version of the computed rotor angular position ($\theta_{MTa}[n]$) during the previous control period, wherein the first product is computed based on the present control period ($T_s[n]$) and a value of a first variable ($\omega_{MT1}[n]$) that is equal to a value ($\omega_{MTa}[n-1]$) of the second angular velocity signal that was computed during the previous control period.

19. A method according to claim 18, when the difference ($\Delta N_p$) from the counter output signal is not equal to zero, further comprising:

outputting, from the processor, the first angular position signal as the second angular position signal without modification; and outputting, from the processor, the first angular velocity signal as the second angular velocity signal without modification.

20. A method according to claim 19, further comprising:

setting, at the processor, the number of times no pulse was received ($N_{np}[n]$) during the present control period to zero (0);

wherein outputting, from the processor, the first angular velocity signal as the second angular velocity signal without modification, comprises:

setting, at the processor, the first variable ($\omega_{MT1}[n]$) equal to a value ($\omega_{MT}[n]$) of the first angular velocity signal that was computed during the present control period ($T_s[n]$), and then setting, at the processor, the second angular velocity signal ($\omega_{MTa}[n]$) equal to the value of the first variable ($\omega_{MT1}[n]$); and wherein outputting, from the processor, the first angular position signal as the second angular position signal without modification, comprises:

setting, at the processor, the second variable ($\theta_{MT1}[n]$) equal to a value ($\theta_{MT}[n]$) of the first angular position signal that was computed during the present control period ($T_s[n]$), and then setting, at the processor, the second angular position signal ($\theta_{MTa}[n]$) equal to the value of the second variable ($\theta_{MT1}[n]$).

* * * * *